United States Patent [19]

Sherman

[11] 4,349,982
[45] Sep. 21, 1982

[54] REFILLABLE RODENT BAIT STATION CONTAINER

[76] Inventor: Daniel Sherman, 76 Ninth Ave., New York, N.Y. 10011

[21] Appl. No.: 202,670

[22] Filed: Oct. 31, 1980

[51] Int. Cl.³ .......................................... A01M 25/00
[52] U.S. Cl. .................................................. 43/131
[58] Field of Search ................... 43/131, 121; 141/365, 141/366; 222/561

[56] References Cited

U.S. PATENT DOCUMENTS

| | | | |
|---|---|---|---|
| 1,561,644 | 11/1925 | Hanson | 43/131 |
| 2,480,724 | 8/1949 | Feussner | 43/131 |
| 2,568,168 | 9/1951 | Query | 43/131 |
| 2,626,089 | 1/1953 | Osfar | 222/561 |
| 2,690,029 | 9/1954 | Mullen | 43/131 |
| 2,725,664 | 12/1955 | Mullen | 43/131 |
| 3,352,053 | 11/1967 | Anderson | 43/131 |
| 4,026,064 | 5/1977 | Baker | 43/131 |

FOREIGN PATENT DOCUMENTS 648419  7/1937  Fed. Rep. of Germany ........ 43/131

*Primary Examiner*—Nicholas P. Godici
*Attorney, Agent, or Firm*—Henderson & Sturm

[57] ABSTRACT

This invention relates to rodent bait stations in general and more specifically to a bait station which is spill proof, tamper proof, and provides metered amounts of rodentcide divided between two separate feeding compartments within the bait station.

7 Claims, 5 Drawing Figures

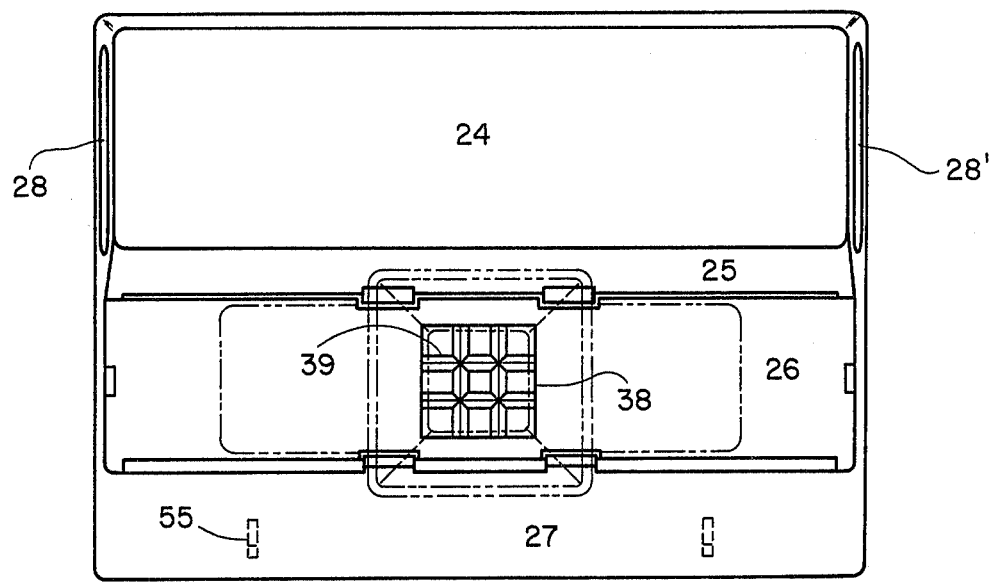
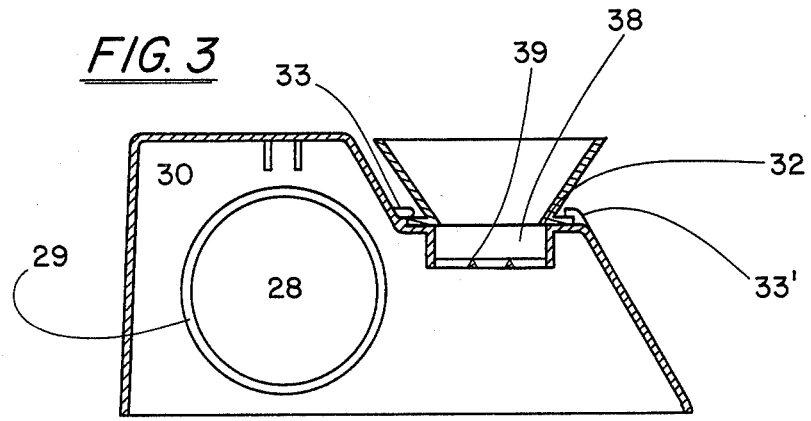
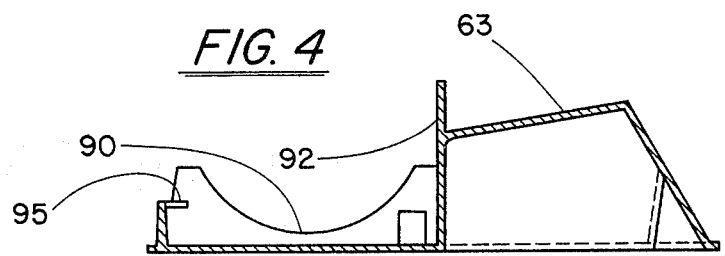

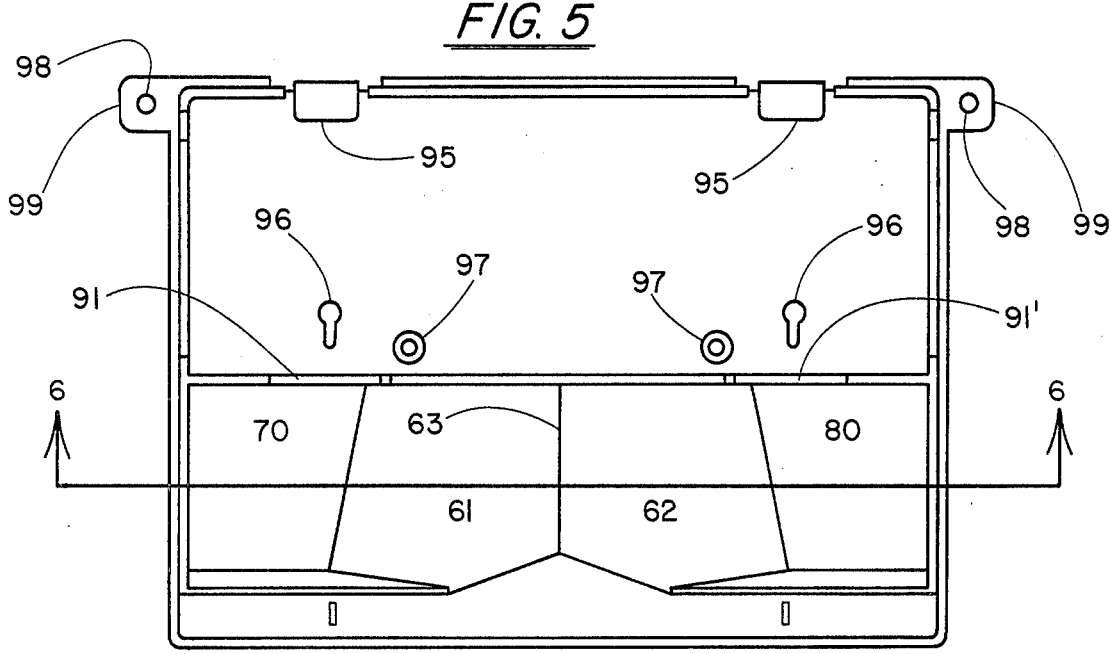
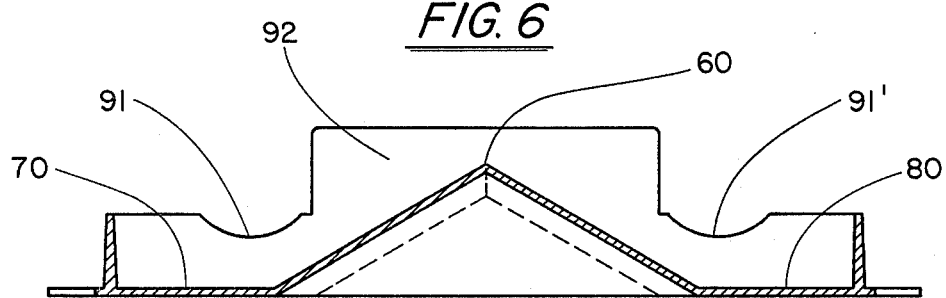

REFILLABLE RODENT BAIT STATION CONTAINER

BACKGROUND OF THE INVENTION

Rodents have plagued mankind for centuries bringing disease and pestilance into major population centers and further competing directly with mankind for foodstuffs either by direct consumption or by fouling the stored material with their droppings, dirt, and parasites.

There have been many solutions proposed in the past to control and reduce the rodent population, and the most effective procedure to date has been the use of poisoned bait. The technique employed by users of poisoned baits is to place the bait in an area infested by rodents, particularly along runways and in dark isolated areas which the rodents seem to favor. The rodents are attracted to the food which is impregnated or mixed with the rodentcide. The poison is ingested by the rodents and causes their demise.

Some of the prior art devices which have been developed to contain and deliver the rodentcide are characterized by U.S. Pat. Nos. 3,965,609; 2,964,871; 2,944,364; 2,683,326; and 2,912,788.

These devices are defective for the following reasons: they are bulky, cumbersome, fragile, susceptible to rupture and spillage of the contents, and present a potential health hazard to children and domestic animals. Most of the devices are, furthermore, intended as a single use item, and are not intended nor designed to be refilled. The devices which are intended for reuse usually require that the device be disassembled in order to replenish the supply. This procedure is time consuming, messy, and usually involves some spillage of the poison, which must be cleaned up for obvious health reasons.

On a whole the prior art devices do not provide a bait station which will be readily and regularly used by the consumer thereby reducing their effectiveness and allowing the rodent population to proliferate.

SUMMARY OF THE INVENTION

An object of the present invention is the provision of a tamper-proof rodent bait station container that can be easily serviced by pest control personnel.

A further object of the instant invention is the provision of a rodent bait station container having internal baffles to inhibit spillage of the container contents when the unit is tipped.

Another object of the instant invention is the provision of a bait container whose center of gravity is disposed at the rear of the unit to provide stability and inhibit tipping.

Still another object of the present invention is the provision of a bait container which provides metered loading to two internal feeding compartments, and is designed to frustrate access to the interior of the unit by anything other than rodents and authorized personnel.

A still further object of the instant invention is the provision of a rodent bait station container which has a plurality of locking and mounting features to maintain the unit's integrity and facilitate installation.

Yet another object of the instant invention is the provision of a bait station container having a sloped frontal configuration which deflects blows from equipment, brooms, feet, etc., and enhances the stability of the unit.

These and other objects, advantages and novel features of the invention will become apparent from the following detailed description of the invention when considered in conjunction with the accompanying drawings.

BRIEF DESCRIPTION OF THE DRAWINGS

FIG. 2 is a top plan view of the cover of the rodent bait station showing the cooperation of the metering bait shute with the bait opening.

FIG. 3 is a cross-sectional detail view of the cover of the rodent bait station container taken through line 1—1 of FIG. 2.

FIG. 4 is a cross sectional detail view of the base of the rodent bait station container taken through line 1—1 of FIG. 2.

FIG. 5 is a top plan view of the base of the rodent bait station showing the disposition of the various locking and mounting elements.

FIG. 6 is a cross-sectional view of the base member taken through line 6—6 of FIG. 5.

DETAILED DESCRIPTION OF THE PREFERRED EMBODIMENT

Figure 1:
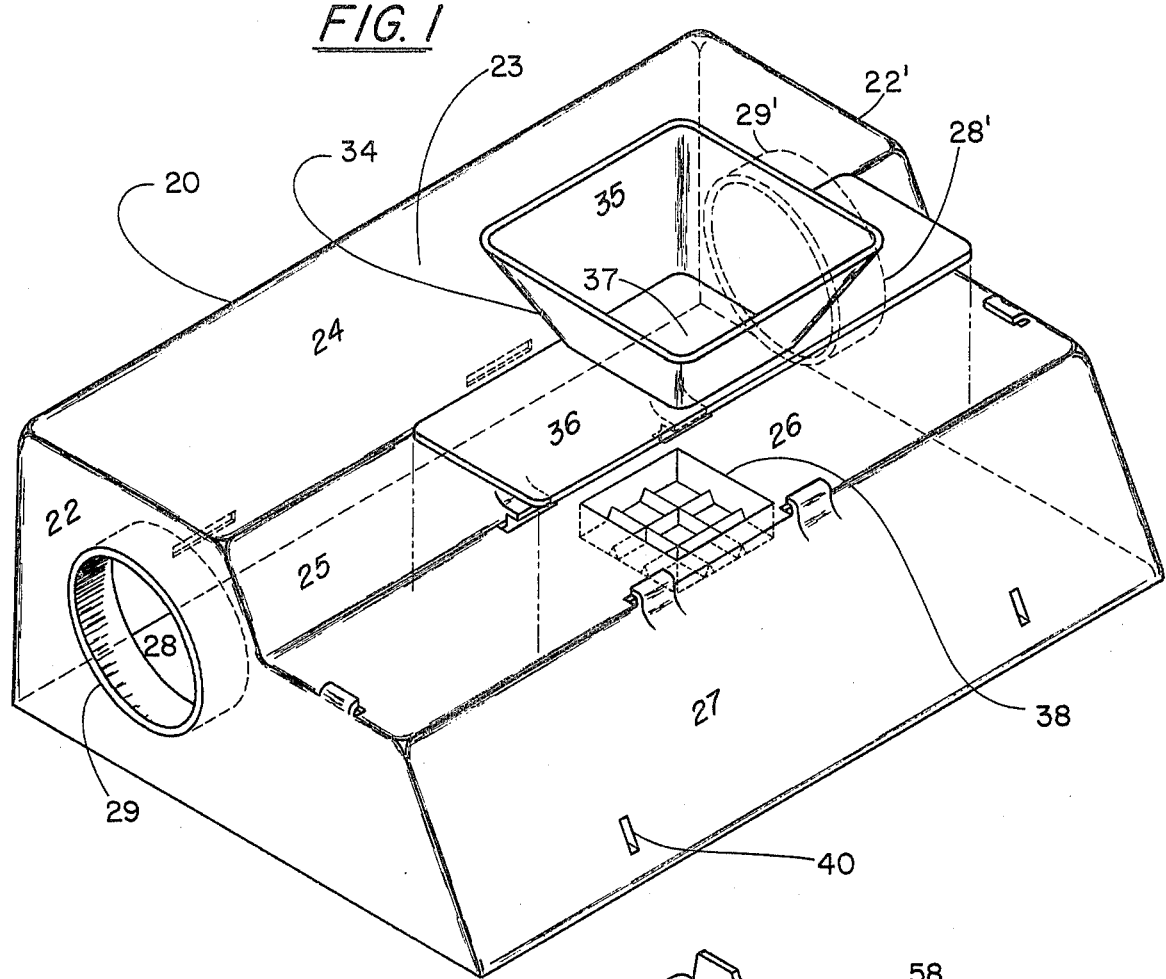
FIG. 1 is an exploded perspective view of the rodent bait station container which comprises the instant invention.
Figure 1:
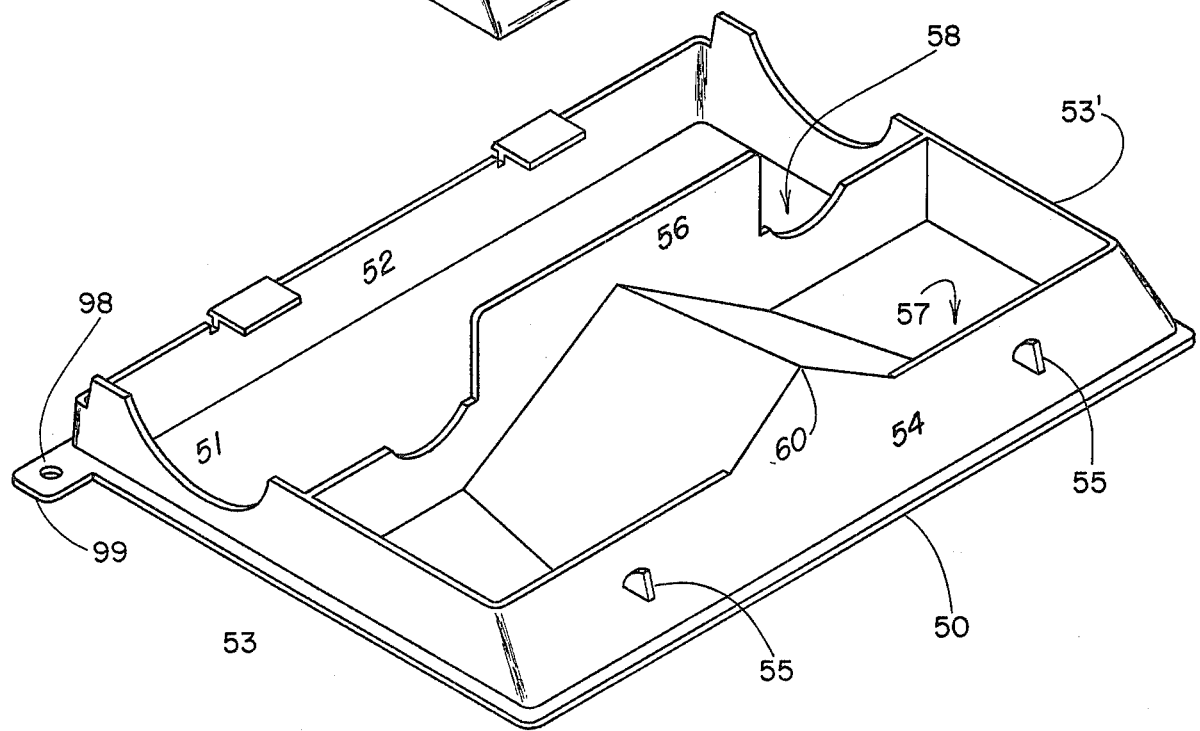

As can be seen by reference to FIG. 1, the rodent bait station container is designated generally as 10 and comprises a cover member 20 and a base member 50.

The cover member 20 comprises a rear wall portion 21 apertured side wall portions 22, 22' and a contoured face portion 23. The face portion is made up from a first horizontally disposed surface 24, a first angled surface 25, a second horizontally disposed surface 26, and a second angled surface 27. Each of the side walls 22,22' are provided with eliptically shaped apertures 28,28' which extend into the hollow interior of the cover member 20 and form baffles 29,29' whose purpose and function will be explained further on in the specification.

The rear wall portion 21, and the first horizontal surface 24 and the first angled surface 25 of the face portion 23, cooperate with the wall portions 22,22' to form a high rear cavity for the rodents to enter and feed in.

The second horizontal surface 26 and the second angled surface 27 of the face portion 23 cooperate with the wall portions 22,22' to form a forward cavity 31 into which the bait is deposited.

The mechanism for depositing the bait into the forward cavity 31 comprises a track 32 formed by shoulders 33,33' which run the length of the second horizontal surface 24 and are disposed on its forward and rearward edges. The track 32 is configured to slidingly engage a bait chute 34, which comprises a tapered, open hopper element 35, which projects upwardly from an elongated flange element 36. The flange element 36 extends outwardly on both sides of the hopper opening 37 and slidingly engages the track 32 via the shoulders 33,33'. The second horizontal surface 26 of the cover portion 23 is provided with a downwardly extending aperture 38, which is dimensioned to cooperate with the hopper opening 37, and is furthermore provided with a grid element 39.

In operation the bait (not shown) is deposited into the hopper 35 and the bait shute 34 is moved along the track 32 to a position where the hopper opening 37 and the aperture 38 coincide, thereby allowing the bait to fall into the forward cavity 31.

It should be appreciated that the bait will begin to fall into the forward cavity 31 as soon as the hopper opening 37 begins to register with the aperture 38. This can occur from either the right or left hand side of the device 10, depending upon the initial disposition of the bait shute 34 on the track 32. The flange element 36 which extends on both sides of the hopper 35 acts as a sealer plate, which closes the apertures 38 to maintain the integrity of the unit, and prevents slippage or access to the forward cavity 31. If the bait shute 34 is inadvertantly left in a position of registration over the aperture 38 the grid 39 will prevent access to the forward cavity 31. This feature is particularly important when the unit is utilized in an area frequented by small children and domestic pets, particularly cats.

Referring to FIGS 1 and 4–6 the base member 50 comprises a floor member 51, a rear wall member 52, side wall members 53,53' and an angled face 54. The angled face 54 of the base member is further provided with one or more projections 55 which cooperate with one or more suitably dimensioned apertures 40 in the second angled surface 27 of the cover member to form a first locking mechanism.

A partition 56 divides the base member into a forward compartment 57 and a rearward compartment 58 which coincide with the forward cavity 31 and rearward cavity 30 of the cover member. When the cover member and base member are disposed in their assembled relationships, two separate chambers are formed within the container interior by the partition 56. The rearward chamber forms the entrance and feeding location for the rodents, and the forward chamber forms the bait receiving tray portion of the device.

The forward chamber has raised central portion 60 which divides the bait tray into two separate feeding trays 70 and 80.

As can best be seen by reference to FIGS. 5 and 6 the raised central portion 60 comprises two slanted, angled walls 61, 62 which converge inwardly and downwardly towards the partition 56. The angled walls 61, 62 are joined at their highest point in a ridge 63 which is centrally disposed beneath the aperture 38 of the cover member 20 when the unit 10 is assembled.

When bait is introduced into the unit it falls from the hopper 35 through the aperture 38 and impinges upon the ridge 63 whereupon it is divided and flows into the feeding trays 70 and 80. Due to the sloped, angled configuration of the raised central portion 60 the bait will tend to accumulate proximate the partition 56.

The side walls 53, 53' and the partition 56 are further provided with recesses 90,90' and 91, 91' respectively. The side wall recesses 90, 91' are configured to accommodate the inwardly extending oval shaped baffle elements 29, 29' of the cover member. These baffle elements form access ports via the apertures 28, 28' for the ingress and igress of rodents with respect to the unit. The partition recesses 91, 91' cooperate with a raised central portion 92 of the partition to create two separate feeding stations for the rodents within the container. The recesses 91, 91' facilitate access of the rodent'head into the bait trays 70 and 80 while the remaining portion of the partition prevent total physical access to the forward cavity and concomitantly prevent bait from spilling over into the rearward cavity. The raised central portion 92 of the partition divides the unit into two chambers, and acts as a baffle to prevent manual removal of the bait from the trays via the side apertures 28, 28'.

The unit 10 is provided with a plurality of locking and mounting means, most of which can be seen by reference to FIG. 5. In addition to the locking tabs 55, which have been described supra, the base member 50 is further provided with one or more projections 95 which extend inwardly from the rear wall 52 and cooperate with suitable configured apertures (not shown) on the cover member to lock the unit together. These projections 95 are disposed on the interior of the unit so that they must be engaged within the interior of container to disassemble the device. This construction is designed to prevent accidental disengagement of the cover from the base. In addition to the locking means illustrated, there is a groove on the base member, and a boss on the cover member (not shown), which insures a snap fit between the respective members 20 and 50.

The mounting means are formed in the floor of the base member and comprise; a pair of key shaped apertures 96; or in the alternative a pair of partially drilled apertures 97, which until the remaining fill is pierced, such as by a mounting screw, will maintain the integrity of the floor 51; and a pair of exterior apertures 98 which extend through lugs 99 and project from the exterior of the base member 50.

In operation the bait container 10 is situated in a location frequented by rodents and fastened in place by inserting suitable securing means such as nails, screws, etc, through one or more of the available mounting means. Once the assembled unit is installed, bait in either a liquid, granular or pellet form is introduced through the hopper and aperture to the respective bait trays. Rodents will thereupon be attracted to the bait and enter the container via the access apertures. Once inside they will consume the bait at either or both of the feeding stations, and after consuming the bait, the rodentcide will cause their eventual demise.

By providing more than one bait tray, the unit can feed at least two rodents at the same time and since the raised portion of the partition physically separates the animals, they are not competing for the same food, and as a direct consequence will consume more of the rodentcide each time they feed.

The angled face of the unit also deflects blows from brooms, feet and other equipment, thereby maintaining the container in the desired location. In addition, the fact that the unit can be replenished without disassembly reduces the time required to service the unit, and increases the likelihood that the stations will be maintained.

Having thereby disclosed the subject matter of this invention it should be obvious that many modifications, substitutions and variations of the invention are possible in light of the above teachings. It is, therefore, to be understood, that the invention may be practiced other than as specifically described, and should be limited only by the breadth and scope of the appended claims.

What I claim is:

1. A rodent bait station container comprising;
    a base member and an apertured cover member which in their assembled relationship form a unit having plurality of chambers, wherein one of said chambers forms a feeding station, and another of said chambers forms a bait tray element, said cover member further comprising,
    a centrally disposed aperture on the face of said cover member, which cooperates with a moveable metered load element mounted on said cover member, and moveable from a first position out of registry with said aperture, and moveable to a second position in register with said aperture to deposit bait into said bait tray element, wherein the bait tray element is provided with a raised central portion which divides the bait tray element into two separate bait tray portions, and the configuration of the raised central portion of the bait tray element is such that bait deposited through the central aperture of the cover member tends to accummulate in the two tray portions.

2. A rodent bait station container as in claim 1 wherein the metered load element slidingly engages a track disposed on either side of said aperture.

3. A rodent bait station container as in claim 2 wherein the base member is provided with a partition which divides the interior of the unit into at least two chambers, and the partition has a raised central portion which forms a first baffle means.

4. A rodent bait station container as in claim 3, wherein the partition in the base member separates the bait tray element from the feeding station, and has a plurality of recesses which provide limited access between said chambers.

5. A rodent bait station container as in claim 4, wherein the sides of the cover member are provided with apertures which extend into the interior of the unit and form a second baffle means.

6. A rodent bait station container as in claim 1, wherein said central aperture is further provided with a grid element.

7. A rodent bait station as in claim 6, wherein said base member and cover member are provided with a plurality of complimentary locking means, which releasably secure the members together as a unit, and said base member is provided with a plurality of mounting apertures.

* * * * *